US006972317B2

(12) United States Patent
Weinert et al.

(10) Patent No.: US 6,972,317 B2
(45) Date of Patent: Dec. 6, 2005

(54) MONOHYDRIC POLYFLUOROOXETANE POLYMER AND RADIATION CURABLE COATINGS CONTAINING A MONOFUNCTIONAL POLYFLUOROOXETANE POLYMER

(75) Inventors: Raymond J. Weinert, Macedonia, OH (US); Guillermina C. Garcia, Akron, OH (US); Aslam Malik, Cameron Park, CA (US); Roland Carlson, Folsom, CA (US); Robert E. Medsker, Hartville, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 340 days.

(21) Appl. No.: 10/108,916

(22) Filed: Mar. 28, 2002

(65) Prior Publication Data

US 2002/0156200 A1 Oct. 24, 2002

Related U.S. Application Data

(62) Division of application No. 09/473,518, filed on Dec. 28, 1999, now Pat. No. 6,403,760.

(51) Int. Cl.$^7$ .............................................. C08G 65/22
(52) U.S. Cl. ...................... 528/402; 549/511; 568/615; 568/620; 568/617; 525/331.6; 525/356; 525/403; 525/409; 525/410
(58) Field of Search ........................ 528/402; 549/511, 549/428, 504, 540; 568/615, 617, 620; 525/331.6, 356, 403, 409, 410, 357, 428; 500/197, 198, 199, 200, 219, 223

(56) References Cited

U.S. PATENT DOCUMENTS

| | | |
|---|---|---|
| 3,100,722 A | 8/1963 | Hermann et al. |
| 3,834,823 A | 9/1974 | Seregely et al. |
| 3,922,457 A | 11/1975 | Barnwell et al. |
| 3,949,132 A | 4/1976 | Seregely et al. |
| 4,051,195 A | 9/1977 | McWhorter |
| 4,118,541 A | 10/1978 | Power et al. |
| 4,603,074 A | 7/1986 | Pate et al. |
| 4,686,275 A | 8/1987 | Bryant et al. |
| 4,746,576 A | 5/1988 | Ozu et al. |
| 4,857,396 A | 8/1989 | Otonari et al. |
| 4,898,981 A | 2/1990 | Falk et al. |
| 4,946,992 A | 8/1990 | Falk et al. |
| 4,988,123 A | 1/1991 | Lin et al. |
| 4,988,797 A | 1/1991 | Wardle et al. |
| 5,021,544 A | 6/1991 | Padget et al. |
| 5,025,052 A | 6/1991 | Crater et al. |
| 5,043,221 A | 8/1991 | Koleske |
| 5,045,624 A | 9/1991 | Falk et al. |
| 5,097,048 A | 3/1992 | Falk et al. |
| 5,099,026 A | 3/1992 | Crater et al. |
| 5,210,179 A | 5/1993 | Stewart |
| 5,230,954 A | 7/1993 | Sakamoto et al. |
| 5,324,764 A | 6/1994 | Fujita et al. |
| 5,361,164 A | 11/1994 | Steliga |
| 5,468,841 A | 11/1995 | Malik et al. |
| 5,543,200 A | 8/1996 | Hargis et al. |
| 5,576,095 A | 11/1996 | Ueda et al. |
| 5,637,657 A | 6/1997 | Anton |
| 5,637,772 A | 6/1997 | Malik et al. |
| 5,641,853 A | 6/1997 | Drysdale |

(Continued)

FOREIGN PATENT DOCUMENTS

| | | |
|---|---|---|
| EP | 348 350 | 12/1989 |
| EP | 430 887 | 6/1991 |
| JP | 63105029 | 5/1988 |
| WO | WO 96/18699 | 6/1996 |
| WO | WO 96/21657 | 7/1996 |
| WO | WO 96/23828 | 8/1996 |
| WO | WO 99/26992 | 6/1999 |
| WO | WO 99/45079 | 9/1999 |
| WO | WO 00/46270 | 8/2000 |

OTHER PUBLICATIONS 10 pages of World Patent Index search results based on PVC and fluoro . . . coating.
4 pages of World Patent Index search results based on PVC and polyester coating.
40 pages of Chemical Abstract search results based on PVC and fluoro . . . coating.
25 pages of Chemical Abstract search results based on PVC and polyester.
CA entries and Derwent patent family printouts JP 03275859; JP 04363370; JP 07004064; JP 07039812; JP 08283654; JP 6216941; and JP 63248827.
Letter to Southwest Texas Distributions, Inc. dated Mar. 5, 1998 to Greg Nernes from Barry Bastion, Product Manager, GenCorp with invoice to Southwest Texas Distributions, Inc. dated Apr. 9, 1998 from GenCorp.

*Primary Examiner*—Tatyana Zalukaeva
(74) *Attorney, Agent, or Firm*—Arthur M. Reginelli; David G. Burleson

(57) ABSTRACT

Monofunctional polyfluorooxetane oligomers and polymers are prepared by the cationic polymerization of fluorooxetane monomers with a monoalcohol. The fluorooxetane oligomers or polymers can be copolymerized with generally cyclic ethers. Alternatively, the polyfluorooxetane oligomer or polymer having a single hydroxyl end group can be functionalized with a variety of compounds so as to yield a functional end group such as an acrylate, a methacrylate, an allylic, an amine, etc., with the functionalized oligomer or polymer being suitable for use in radiation curable or thermal curable coating compositions. These functionalized polymers can be copolymerized and cured to provide improvements in wetting and surface properties that have previously been provided by migratory chemicals such as waxes and oils. The partially or fully fluorinated side groups of the fluorooxetanes are believed to be disproportionately present at the interfaces between the coating and the substrate and between the coating and the atmosphere.

8 Claims, No Drawings

U.S. PATENT DOCUMENTS

| | | |
|---|---|---|
| 5,649,828 A | 7/1997 | Kawashima |
| 5,650,483 A | 7/1997 | Malik et al. |
| 5,654,450 A | 8/1997 | Malik et al. |
| 5,663,289 A | 9/1997 | Archibald et al. |
| 5,668,250 A | 9/1997 | Malik et al. |
| 5,668,251 A | 9/1997 | Malik et al. |
| 5,672,651 A | 9/1997 | Smith |
| 5,674,951 A | 10/1997 | Hargis et al. |
| 5,681,890 A | 10/1997 | Tanaka et al. |
| 5,703,194 A | 12/1997 | Malik et al. |
| 5,798,402 A | 8/1998 | Fitzgerald et al. |
| 5,807,977 A | 9/1998 | Malik et al. |
| 5,898,046 A | 4/1999 | Raiford et al. |
| 6,037,483 A | 3/2000 | Malik et al. |
| 6,040,419 A | 3/2000 | Drysdale et al. |
| 6,168,866 B1 | 1/2001 | Clark |
| 6,239,247 B1 | 5/2001 | Allewaert et al. |
| 6,380,351 B1 | 4/2002 | Malik et al. |
| 6,448,368 B1 | 9/2002 | Malik et al. |
| 6,479,623 B1 | 11/2002 | Malik et al. |

MONOHYDRIC POLYFLUOROOXETANE POLYMER AND RADIATION CURABLE COATINGS CONTAINING A MONOFUNCTIONAL POLYFLUOROOXETANE POLYMER

This is a divisional Application of Ser. No. 09/473,518, filed Dec. 28, 1999, now U.S. Pat. No. 6,403,760.

FIELD OF INVENTION

The present invention relates to monohydroxyl polyfluorooxetane oligomers and polymers. The present invention further relates to radiation curable coatings made from functionalized polyfluorooxetane oligomers or polymers.

BACKGROUND OF THE INVENTION

Traditionally radiation curable coatings utilized combinations silicone oils, wetting agents and polyethylene waxes to provide smoothness, abrasion resistance, low friction and scratch resistance. However these materials can be largely fugitive in nature and thus migratory leading to handling problems, lowering durability, and possibly working at cross-purposes leading to decreases in other coating properties such as gloss.

U.S. Pat. No. 5,411,996 disclosed the use of fluoroalcohol in U.V. epoxy-silicone coating formulations. The fluorinated alcohols were used to solubilize the U.V. initiator (sulfonium salt) to allow the polymerization reaction to occur.

U.S. Pat. No. 5,081,165 related to an anti-fouling coating composition comprising a photopolymerization initiator or thermal polymerization initiator and fluorine containing (meth)acrylate.

U.S. Pat. No. 4,833,207 relates to a curable composition for forming a cladding for an optical fiber having a refractive index of about 1.43 to 1.60.

U.S. Pat. No. 5,674,951 discloses isocyanate functionalized polyoxetane polymers with pendant fluorinated side chains that can optionally be chain extended with polyoxetanes or other polyethers, have the isocyanate group blocked, and be crosslinked into a network. These coatings were effective for glass run channels.

SUMMARY OF THE INVENTION

Monoalcohols are reacted with fluorooxetane monomers to produce monohydroxyl polyfluorooxetane oligomers and polymers utilizing cationic catalysts. The polyfluorooxetane oligomers and polymers can be reacted with cyclic ethers, or they can be functionalized with various end groups and thereafter used in a radiation curable coating composition. Generally, the oligomer or polymer can contain various functional groups such as acrylate, methacrylate, or a less reactive allylic, or other functional groups such as melamine, amine, epoxide, silyl, isocyanate, aceteyl acetate, and the like. These polyfluorooxetanes can be called fluorinated polyoxetanes or polyoxetanes with partially fluorinated pendant side groups (chains). These fluorinated oxetane repeating units have a single pendant fluorinated side group per repeating unit or they can have two pendant fluorinated side groups per repeating unit. The coating composition comprises the functionalized oligomer or polymer, a comonomer, optional UV initiator, crosslinking agents, and optionally other additives like pigments, plasticizers, rheology modifiers etc.

The functionalized polyfluorooxetane can be produced by several methods, but due to the reactivity of the hydroxyl groups of the polyfluorooxetane it is desirable to sequentially add the reactants so nearly complete functionalization of the polyfluorooxetane can be achieved. Typically, an isocyanate or epoxy functionalize poly-fluorooxetane is first formed and that is reacted with a compound which will yield a functionalized polyfluorooxetane with intervening urethane linkages or linkages derived from the epoxy compound. Alternatively the functionalizing compound can be reacted with epoxy or isocyanate and the resulting compound then reacted with the polyfluorooxetane. Alternatively the fluorinated polyol may be made through tranesterification or an unsaturated alcohol may be used in the initiation step for the formation of the mono-functional fluorinated material.

DETAILED DESCRIPTION OF THE INVENTION

Generally, any type of monoalcohol can be utilized to produce the monohydroxyl polyfluorooxetane (MOX) oligomers or polymers of the present invention. The monoalcohol generally has from 1 to about 40 and preferably from about 1 to about 18 carbon atoms. Examples of specific types of monohydric alcohols include the various aliphatic alcohols such as the paraffinic alcohols, for example methyl alcohol, ethyl alcohol, propyl alcohol, etc., or the olefinic alcohols, for example vinyl alcohol, allyl alcohol, and the like. Various alicyclic alcohols such as cyclohexanol and the like can be utilized, as well as various aromatic alcohols such as benzyl alcohol, phenol, and the like. Various heterocyclic alcohols can also be utilized such as furfuryl alcohol, and the like. Moreover, halogenated alcohols and especially fluoroalcohols are desired such as trifluoroethanol, heptafluorobutanol, and the like. Especially preferred monohydric alcohols include benzyl alcohol, trifluoroethanol, heptafluorobutanol, and allyl alcohol.

The oxetane monomer used to form the polyfluorooxetane has the structure

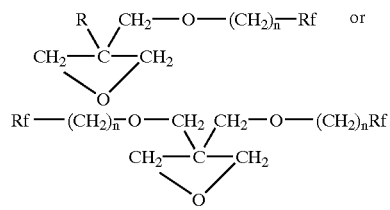

and the repeating unit derived from the oxetane monomer has the formula

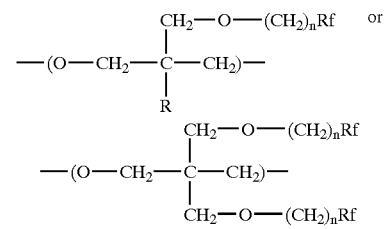

where each n is the same or different and independently, is an integer between 1 and 5, R is hydrogen or an alkyl of 1 to 6 carbon atoms, and each Rf is the same or different and independently on each repeat unit is a linear or branched fluorinated alkyl of 1 to 20 carbon atoms, a minimum of 75 percent of the non-carbon atoms of the alkyl being fluorine atoms and optionally the remaining non-carbon atoms being H, I, Cl, or Br; or each Rf is the same or different and individually is an oxaperfluorinated polyether having from 4 to 60 carbon atoms. The amount of the fluorooxetane monomers utilized is sufficient to yield a degree of polymerization (DP) of from about 2 to about 150, desirably from about 3 to about 50, and preferably from about 12 to about 25.

Generally any suitable cationic catalyst can be utilized to polymerize the fluorooxetane monomers such as various Lewis acids and complexes thereof. Examples of such cationic catalysts include $Sn(IV)Cl_4$, antimony pentafluoride, phosphorous pentafluoride, and the like, with a complex of borontrifluoride and tetrahydrofuran being preferred. Optionally, various co-catalysts can be utilized such as water, butanediol, cyclohexanedimethanol, and the like.

The homopolymerization is generally carried out in the presence of a catalyst as well as in a solvent for the monoalcohol and the fluorooxetane monomer. Examples of suitable solvents include trifluorotoluene, dichloroethane, dimethylformamide, as well as dichloromethane. The amount of the alcohol and catalyst will generally vary inversely with the desired molecular weight of the polymer. That is, the polymerization is initiated by each alcohol and catalyst molecule generally on a quantitative basis for a given amount of fluorooxetane monomer, hence, the molecular weight of the polyfluorooxetane oligomer or polymer will be determined by the amount of alcohol utilized.

The reaction rate will vary with temperature. Accordingly, the reaction time is generally from 2 hours to 40 hours, and desirably is from about 4 to about 24 hours. The polymerization temperatures are generally from about 0° C. up to about 100° C., and desirably from about 18° C. to about 50° C. Lower reaction temperatures result in very slow reaction rates, whereas higher reaction temperatures can enhance the formation of cyclic structures containing from 3 to 4 oxetane units. As noted, monomer conversion to polymer is essentially quantitative. The monohydroxyl polyfluorooxetane oligomers or polymers produced are washed with water to obtain a neutral pH and the water removed as by decanting. Subsequently, any suitable desiccant can be utilized such as calcium chloride, phosphorous pentoxide, calcium carbonate, magnesium sulfate, molecular sieves, to dry the oligomers or polymers.

The monofunctional polyfluorooxetane oligomers or polymers generally have the formula

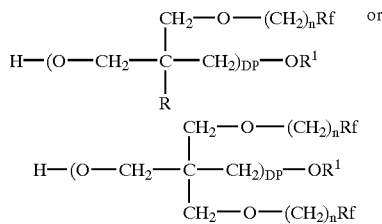

where "n" R, Rf and DP are as described hereinabove and $R^1$ is the organic group of the reactive monoalcohol. That is, $R^1$ can be an aliphatic group such as a paraffinic group or an olefinic group, or an alicyclic group, or an aromatic group, or a heterocyclic group, or a halogenated organic group, and the like, having from 1 to about 40 and preferably from 1 to about 18 carbon atoms. If more than one type of monoalcohol is utilized to prepare the polyfluorooxetane oligomers or polymers, naturally the $R^1$ of one or more different polymers or oligomers will be different.

The monofunctional polyoxetane oligomers or polymers can be used in a variety of ways such as surface modifiers, in coatings, in polymer blends and alloys, within interpenetrating polymer networks, as well as in block and graft copolymers.

The fluorooxetane monomers can also be copolymerized with a variety of monomers having epoxy (oxirane) functionality such as epichlorohydrin, propylene oxide, ethylene oxide, butyl glycidylether, and perfluorooctyl propylene oxide; monomers having a 4-membered cyclic ether group such as trimethylene oxide, 3,3-bis(chloromethyl)oxetane, 3,3-bis(bromomethyl)oxetane, and, 3,3-bromomethyl (methyl)oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. The copolymerization reaction is carried out generally under the same conditions as is the polymerization of the fluorooxetane monomers set forth hereinabove. The amount of the comonomer is from about 0.1% to about 99% by weight, desirably from about 1.5% to about 50% by weight, and preferably from about 2% to about 10% by weight based upon the total weight of the one or more comonomers and the fluorooxetane monomers.

A primary use of the monohydric polyfluorooxetane oligomers and polymers (alcohols) is to functionalize the same with various functional end groups for subsequent use. Such functional end groups include acrylate, methacrylate, allylic, melamine, amine, aceteyl acetate, epoxide, silyl, isocyanate, and the like. Such end groups can be derived from a variety of compounds known to the art and to the literature. For example, acrylate end groups can be derived from hydroxyethyl acrylate, methacrylate end groups can be derived from hydroxymethyl methacrylate, allylic end groups can be derived from allylchloride, melamine end groups can be derived from Cymel 303, amine end groups can be derived from hexamethylene diamine, epoxide end groups can be derived from glycidal methacrylate, silyl end groups can be derived from chlorotrimethylsilane, and isocyanate end groups can be derived from isophorone diisocyanate. Hereinafter, the term "functionalized" polyfluorooxetane oligomers and polymers are meant to include such end groups. The polyfluorooxetanes of the present invention can also be called fluorinated polyoxetanes or polyoxetanes with partially fluorinated pendant side groups (chains). These pendant side groups include the Rf groups defined later. The amount of the functionalizing compounds is from about 1.0 to about 1.2, and preferably from about 1.0 to about 1.05 weight equivalents. The reaction temperature will vary from about 10° C. to about 120° C. and preferably from about 65° C. to about 90° C. Reaction time will generally vary with the temperature and with the reactivity of the components.

The coating composition of the present invention comprises a functionalized polyfluorooxetane oligomer or polymer, a comonomer, optionally a UV initiator, crosslinking agents, and optionally other additives such as pigments, plasticizers, rheology modifiers etc. While the functionalized polyfluorooxetane can be used in about any concentration in the radiation curable coating it is generally effective in an amount of repeating units of the illustrated formula from about 0.05, or from about 0.1, or from about 1 to about 10 or 20 weight percent based on the weight of the coating composition.

The various functionalized polyfluorooxetanes can be produced by several methods, but due to the lower reactivity of the hydroxyl groups of the polyfluorooxetane with isocyanate and epoxy groups, it is desirable to sequentially add the reactants so nearly complete functionalization of the polyfluorooxetane can be achieved. Typically an isocyanate or epoxy functionalize polyfluorooxetane is first formed and then reacted with a compound forming a functionalized end group such as a hydroxy alkyl acrylate, (e.g. hydroxyethyl acrylate) to form a functionalized polyfluorooxetane. In a similar manner, other compounds can be utilized to form the above noted functional end group such as methacrylate, allylic, melamine, amine, and the like. Alternatively, the compound forming the functional end group can be reacted with the epoxy or isocyanate to functionalize the same and that compound reacted with the polyfluorooxetane.

The polyfluorooxetane when incorporated into a coating via the functionalized group, e.g. acrylate, amine, etc., provides improved wear resistance, mar resistance, stain resistance, leveling, improved slip and lower coefficient of friction. There are generally enhanced surface properties relative to a coating without the additive. While not being bound by any explanation, it is anticipated that the polyfluorooxetane, to the extent possible while blended with the other components and after curing, migrates to the interfaces between the coating and the substrate and the interface between the coating and the atmosphere providing increased wetting at the solid interface improving adhesion, and lowering the surface tension at the atmosphere interface improving leveling, providing improved surfaces (gloss/ appearance) at the atmosphere interface, and improved wear and stain resistance at the atmosphere interface. The application is focused on coatings because molded articles and thicker compositions are more difficult to cure with radiation cures, but this does not preclude their use in thick articles.

Another focus of this application is adding the properties of the partially or fully fluorinated pendant groups without detracting from the inherent physical bulk properties typically found in vinyl ester resin, acrylic, urethane acrylic and epoxy acrylic compositions. The polyoxetane in being available as a polyol can be conveniently reacted in the network via epoxy or isocyanate reactive groups which are common connecting groups in acrylic, methacrylic, vinyl ester resin and acrylic compositions.

The substrates for the radiation curable coating include thermoplastic or thermoset plastics, paper, metals, wovens and nonwovens, cellulosics other than paper, etc. Preferred plastics include polyvinyl chloride, polyolefin (surface treated and untreated), polyesters, and polycarbonates. The plastics may be formed into furniture, cabinets, flooring overlay, building products, etc. Preferred cellulosics include wood products such as furniture, cabinets, wood flooring, paper, and the like. The coating is useful as a protective coating for any of the above substrates.

The coating can be modified to be flexible or rigid depending on the flexibility of the substrate. The polarity of the coating can be adjusted by changing the polarity of the acrylate, or methacrylate, or allylic, terminated components or the monomer to make it compatible with the substrate. The coating can be made more flexible by using less crosslinking agents or choosing a comonomer that forms a lower glass transition temperature polymer. The backbone of a polyfunctional crosslinking agent polymer can also be chosen to result in a softer lower flexural modulus coating.

Various curing options are available for the coating composition. As shown in the examples some of the components cure upon standing if polymerization inhibitors are not present. Electron beam irradiation can be used to cure the coatings. If ultraviolet (UV) activated free radical photoinitiators are present, ultraviolet light can activate curing. When UV cure is utilized, the functionalized end groups can be acrylate, methacrylate, allylic, or epoxide. Thermal cure can also be utilized and in this situation the functionalized groups include melamine, amine, acetylacetate, silyl, isocyanate, and epoxide. Combinations of two curatives of a single type can be used. The amount and types of curatives are well known to the art of radiation and UV curatives. The amount of curatives is that which converts at least 50, 75 or 90 or even 100 weight percent of the polymerizable components of the coating into nonextractable gel. The polymerization conditions for the coating composition are generally the same as set forth above with regard to copolymerizing polyfluorooxetane monomers with cyclic ethers. That is, any suitable cationic catalyst can be utilized such as a complex of borontrifluoride and tetrahydrofurane, the polymerization being carried out in the presence of a polar solvent such as dichloromethane, reaction rate varying with temperature, and the like, all of which is set forth hereinabove and incorporated by reference.

The comonomers that can be used in the coating are generally any unsaturated monomers copolymerizable through said functionalized polyfluorooxetane. Comonomers can be distinguished from the later described crosslinking agents such as polyfunctional acrylate oligomers by the fact that comonomers are generally monofunctional and form a linear polymer while polyfunctional reactants form crosslinked polymers. Comonomers include unsaturated monomers such as vinyl aromatic monomers of 8 to 12 carbon atoms such as styrene, alphamethylstyrene, vinyltoluene, and the like; ethylenically unsaturated monomers generally free of acid groups having from 4 to 30 carbon atoms including acrylates such as methyl(meth) acrylate, ethyl (meth)acrylate, propyl (meth)acrylate; acrylic acid, etc.; (cyclo)alkyl esters of maleic acid, fumaric acid and itaconic acid, for example dimethyl maleate, diethyl maleate, diethyl fumarate, dipropyl maleate, dibutyl maleate and dibutyl fumarate; (meth)acrylates containing ether groups, for example 2-methoxyethyl (meth)acrylate, 2-ethoxyethyl (meth)acrylate and 3-methoxypropyl (meth) acrylate; hydroxyalkyl (meth)acrylates, for example 2-hydroxyethyl (meth)acrylate, and 2-hydroxypropyl (meth) acrylate; hydroxypolypropylene glycol (meth)acrylates, and the like; and N-vinyl pyrrolidone; various conjugated dienes having from 4 to 10 carbon atoms such as butadiene, isoprene, and the like. In the above list, whenever (meth) is utilized, it means that the existence of a methyl group within the compound is optional. The monomer(s) are generally utilized in any desired amount and selected based upon a variety of considerations including volatilty, relative health hazards from exposure, their reactivity ratios in copolymerization with the acrylate terminated polymers and oligomers, etc.

One type of crosslinking agents are the various polyfunctional ligomers and polymers (other than the monofunctionalized polyluorooxetane) utilized in radiation curable coatings. They are characterized by the presence of two or more unsaturated carbon to carbon double bonds that can copolymerize with the comonomer(s). These components are added in effective amounts to change the physical properties of the coatings such as crosslink density, which has an effect on modulus and strength. These reactants contribute significantly to the solvent resistance of the cured coatings as the crosslinks they provide inhibit swelling in common solvents. Examples of such crosslinking agents include Ebecryl 810, TRPGDA, tripropylene glycol diacrylate; and TMPTA, trimethylolpropane triacrylate. Crosslinking agents also include oligomeric polyunsaturated compounds which act not only as crosslinking agents, but also contribute to the overall performance of the UV curable coating. Such compounds include acrylated or methacrylated, or allylic functionalized polyesters such as Ebecryl 81, an acrylated polyester; acrylated, or methacrylated, or allylic functionalized urethane acrylics such as Ebecryl 4883, an acrylated aliphatic urethane; acrylated or methacrylated, or allylic functionalized urethane polyesters; acrylated, or methacrylated, or allylic functionalized epoxy; or acrylated or methacrylated, or allylic functionalized epoxy polyesters.

Ultraviolet light (UV) activated curative(s) may be used in the coating in an effective amount to cause polymerization of the comonomer(s) and crosslinking by the polyfunctional oligomer and polymeric crosslinking agents. These curatives may be any chemical compound that can generate free radicals on exposure to ultraviolet radiation. UV activated curatives are set forth in U.S. Pat. Nos. 5,411,996; 4,882,201 and 4,279,717 herein incorporated by reference. Other UV activated curatives such as Cyracure UVR-6110 and Cyracure UVI-6974 used in the examples are commercially available and known to the art.

Other components of the coating include fillers such as $TiO_2$, and zinc oxide, as well as other pigments and colorants; metallic pigments such as aluminum flakes; antigloss agents such as precipitated and organic silicas; dyes; plasticizers such as ester oils, triglycerides, hydrocarbon oils; calcium carbonate; clay; talc; waxes; flow modifiers such as rheology modifiers, shear thinning agents; accelerators or coinitiators such as amines, and wetting agents and surface modifiers for fillers.

The oxetane polymer (including copolymers, terpolymers, etc.) generally have one hydroxyl group although two or more terminal hydroxyl groups are possible for these polymers. Molecules with two or more hydroxyl groups are generally referred to as polyols. Monohydric alcohols refers to alcohols with only one hydroxyl group. These alcohols desirably have degrees of polymerization from about 2, 3, or 4 to about 150, more desirably from about 3 to about 100 and preferably from about 3 to about 30 or 50. Desirably they have from about 1 hydroxyl group per molecule although a trace of polyols can be accepted as they do not interfere with the properties as shown in the examples.

The reactivity of the polyfluorooxetane with isocyanate groups and with epoxy groups is generally not as good as the reactivity of conventional polyethers such as poly(ethylene oxide) with isocyanates and epoxies. Therefore it is desirable to control the reaction sequence and reaction ratios to maximize the functionalization of the polyfluorooxetane with the isocyanate or epoxy groups and then with the acrylate, methacrylate, or amine, etc., functionality.

One procedure is to first react the polyfluorooxetane with the di or polyisocyanate or di or poly epoxy compound to generate (form) isocyanate or epoxy groups on the end (terminusi) of the polyfluorooxetane (isocyanate or epoxy terminated polyfluorooxetane). Catalysts and or other favorable reaction conditions (heating) may be employed to force this reaction towards completion.

The reaction between the hydroxy group and the isocyanate or epoxy group can be monitored by various chemical analysis methods to optimize reaction conditions. Desirably at least 2 moles of isocyanate groups or epoxy groups are present for every mole of hydroxyl group. This promotes end capping of the monohydric polyfluorooxetane rather than chain extension, which is the predominant reaction when the ratio of isocyanate or epoxy groups to hydroxyl groups is 1:1. In most embodiments chain extension is not desirable as the resulting higher molecular weight polymers increase the coating viscosity and may decrease the number of load bearing chains, which can decrease physical properties. Desirably the moles of isocyanate groups or epoxy groups is between 2 and 3 per mole of hydroxyl groups and more desirably between 2.0 and 2.5. Other reaction conditions can be optimized to further limit chain extension.

After an isocyanate or epoxy terminated polyfluorooxetane is formed it can be reacted with a functionalizing compound yielding the above noted functional group such as an acrylate, or methacrylate, or allylic, etc. As noted above, hydroxyalkyl acrylates, such as hydroxyethyl acrylate or hydroxyethyl (alk)acrylate are preferred as the hydroxyl groups forms a very chemically stable urethane linkage. The use of "(alk) before acrylate is used to indicate the optional inclusion of alkyl substituents of 1 to 6 carbon atoms. Other acrylate, etc., functional monomer(s) that can be attached to the isocyanate or epoxy functionalized polyfluorooxetane as noted above include amine functional acrylates, acrylamides, or acrylic acids, and the like.

Another way to achieve the same result is to react the di or polyfunctional isocyanate or epoxy compound with the compound yielding the acrylate, methacrylate, allylic, etc. functional group in a mole ratio of isocyanate or epoxy groups to the functional forming compound (e.g. hydroxyl) of above 2, more desirably from about 2 to 3 and preferably about 2 to about 2.5. This will form an isocyanate or epoxy functionalized acrylate, or methacrylate, or allylic, etc. One such reaction product, glycidyl methacrylate, is commercially available. These isocyanate or epoxy functional acrylates, or methacrylates, or allylics, etc., can be reacted with the polyfluorooxetane to produce a monofunctionalized (acrylate, etc.) polyfluorooxetane.

The di- or polyisocyanate compound can generally be any compound of the formula $X-(NCO)_y$ where y is an integer above 2 and X is an aliphatic group of 4 to 100 carbon atoms, an aromatic group of 6 to 20 carbon atoms, or a combination of alkyl and aromatic groups or alkyl substituted aromatic or aromatic substituted alkyl of 7 to 30 carbon atoms or oligomers thereof. These isocyanate compounds are well known to the art. Preferred ones are 4',4-methylene diphenyl isocyanate (MDI) as well as polymeric MDI, which is a liquid rather than a crystalline solid, toluene diisocyanate, 1,6-hexane diisocyanate, isophorone diisocyanate (preferred), trimethylhexane diisocyanate, etc.

Similarly the epoxy compounds can generally have the formula

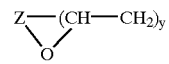

where y is as previously defined and Z is a di or polyvalent group having from 2 to 100 carbon atoms, often 1 or more oxygen atoms, and sometimes other heteroatoms besides oxygen and hydrogen. It is desirable to keep the molecular weight of the epoxy compound as low as higher molecular weights will increase the viscosity.

EXPERIMENTAL

Example 1

Preparation of Monohydric Polyfluorooxetane using Benzyl Alcohol

Only glass reactors and condensers were used in this procedure. All glassware and chemicals were dried prior to use. A 500 mL round bottomed flask equipped with a condenser, addition funnel, and rubber septum was charged with 38.5 grams of dichoromethane (0.4 grams per gram of reactant). The initiator complex, boron trifluoride-tetrahydrofuran and benzyl alcohol (mono-functional alcohol) were added to the reaction flask. Tetrahydrofuran (25.40 grams) and trifluoroethanol oxetane (cyclic) (68.40 grams) were added to an addition funnel. Approximately one-third of the mixture was added to the round-bottomed flask and allowed to stir for approximately 15 to 30 minutes until the reaction was initiated. The temperature was maintained at a temperature of about 20 to 23° C. The remaining monomer mixture was added dropwise over a two-hour period. The reaction mixture was allowed to stir overnight (16 hours) until the conversion reached 97 to 99 percent as measured by 1H-NMR. The reaction mixture was washed with water to a neutral pH, the water was decanted and the product was dried over magnesium sulfate. The remaining solvents were removed at reduced pressure.

Example 2

Preparation of Monohydric Polyfluorooxetane Using Trifluoroethanol

Dichloromethane (26.6 g) was introduced into a dry flask under a dry nitrogen purge. $BF_3$-THF (7.57 g) was then slowly syringed into the flask and the mixture stirred. While stirring, trifluorcethanol (13.6 g) was slowly syringed into the reactor. The mixture temperature was then brought to 35° C. and allowed to react for approximately 30 minutes. Fifty grams (50 g) of 3-FOX monomer was then slowly added to the reactor with good stirring and the temperature of mixture monitored. A sample to determine monomer conversion by 1H-NMR spectroscopy was taken shortly after a reaction exotherm is observed. Monomer addition continues at a rate to maintain a reaction temperature between 38 and 40° C. After the monomer addition was complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase is again tested for pH and discarded.

This process was repeated until the pH of the aqueous phase was at least 5. The organic phase was then subjected to rotating evaporation until all the dichloromethane is gone as measured by NMR. Characterization by proton NMR spectroscopy showed the polyol to have an average degree of polymerization (Dp) of 7.6 and a tetrahydrofuran (THF) comonomer content of 14.3 mole %.

Example 3

Preparation of Monohydric Polyfluorooxetane Using Allyl Alcohol

Dichloromethane (26.6 g) was introduced into a dry flask under a dry nitrogen purge. $BF_3$-THF (2.53 g) was then slowly syringed into the flask and the mixture stirred. While stirring, allyl alcohol (2.62 g) was slowly syringed into the reactor. The mixture temperature was then brought to 35° C. and allowed to react for approximately 30 minutes. Fifty grams (50 g) of 3-FOX monomers were then slowly added to the reactor with good stirring and the temperature of mixture monitored. A sample to determine monomer conversion by 1H-NMR spectroscopy was taken shortly after a reaction exotherm is observed. Monomer addition continues at a rate to maintain a reaction temperature between 38 and 40° C. After the monomer addition is complete, the reaction temperature was maintained in the range stated above for about 2 hours, until quantitative conversion (>99.5 mole %) of the monomer was achieved.

Polymer Work-up Procedure

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase was again tested for pH and discarded. This process was repeated until the pH of the aqueous phase was at least 5. The organic phase was then subjected to rotating evaporation until all the dichloromethane was gone as measured by NMR. Characterization by proton NMR spectroscopy showed the polyol to have an average degree of polymerization (Dp) of 8.3 and a tetrahydrofuran (THF) comonomer content of 4.5 mole %.

Example 4

Preparation of Di(urethane-acrylate) of Poly-7-FOX

A 250 mL, 3 neck round bottom flask fitted with a mechanical stirrer and a thermometer was dried under nitrogen and charged with poly-7-FOX diol (polyfluorooxetane diol with heptafluoro group) (24.3 grams, 9.1 meq.) from Example 5. Isophorone diisocyanate (3.0 grams, 27.2 meq) and dibutyltindilaurate (12 mg) were added and the mixture was heated at 70 C for 14 hours. The reaction mixture was cooled to room temperature and washed with heptane (2 times 100 mL each). The isocyanate-terminated poly-7-FOX prepolymer was then dissolved in tetrahydrofuran (50 mL) and treated with dibutyltin dilaurate (12 mg). The resulting solution was reacted with 2-hydroxyethyl acrylate (HEA, 1.16 gram, 10 meq) at room temperature. No observable exotherm was observed on the addition of HEA. The progress of the reaction was monitored by following the disappearance of the isocyanate band in an infrared spectroscopic spectrum (IR) at 2270 $cm^{-1}$. The mixture was heated at a temperature of 60 C for 4 hours. On completion, as indicated by the disappearance of the NCO band in the IR, the reaction mixture was precipitated into water (450 mL). The resulting solution was dried over magnesium sulfate, filtered and stripped of solvent under reduced pressure to produce 17.2 grams of a urethane-acrylate terminated poly-7-FOX.

Example 5–8

The following general procedure was used to generate examples 5–8. A 3-liter, 4-neck round bottom flask fitted with a mechanical stirrer, condenser, and a thermometer was dried under nitrogen and charged with poly-3-FOX diol (405 grams, 0.29 eq). Isophorone diisocyanate (69 grams, 0.61 eq) and dibutyltindilaurate (0.2 gram) were added at room temperature. A mild exotherm resulting in a temperature increase from 26 to 30 C was observed. The resulting mixture was stirred at ambient temperature for one hour and then heated to 65 C for one hour. The mixture was then cooled to 30 C and 2-hydroxyethyl acrylate (37.4 grams, 0.32 eq.) was added over a thirty-minute period. The mixture was stirred at ambient temperature for 16 hours at which point IR analysis revealed the presence of a strong NCO stretching band at 2270 cm−1. Dibutyltindilaurate catalyst (0.3 grams) was added and the mixture was heated at 60 C for 3 hours and then at ambient temperature for 16 hours. A 50 gram sample of acrylate material was removed. An inhibitor (4-methoxyphenol, 0.47 grams) was added and the mixture was stirred vigorously to disperse the inhibitor. The resulting mixture, a colorless viscous oil, was transferred to disperse the inhibitor. The resulting mixture, a colorless viscous oil, was transferred to a plastic carboy and retained for further use. Overall 505 grams of the copolymer was isolated representing a yield of 98.7%.

Example 9
Preparation of Poly-FOX Mono-Urethane Acrylate

To a clean dry 500 mL reaction kettle, 13.61 grams of isophorone diisocyanate was added. The reactor was heated to 65° C. and 192.1 grams of poly-3-FOX mono-ol and 0.10 grams of dibutyltindilaurate was added dropwise over 90 minutes. The reaction was allowed to stir (approximately 4 hours) until an isocyanate value of 0.31 mmol/gram was reached. The reaction mixture was cooled to 50° C. The resulting product is a mono-functional isocyanate capped poly-3-FOX.

The monofunctional isocyanate capped poly-3-FOX reaction mixture was maintained at 50° C.; and 7.51 grams of hydroxyethyl acrylate and 0.08 grams of dibutyl tin dilaurate were added dropwise to the reaction mixture. The reaction was stirred and additional hydroxyethyl acrylate was added as needed until the 2300 cm−1 infrared peak associated with the unreacted isocyanate on the monofunctional isocyanate capped poly-3-FOX had disappeared. 0.20 grams of 4-methoxy phenol were added to the final mixture as an inhibitor.

Preparation of Coating Formulations

The comonomers and acrylated resins (e.g. Ebecryl 81, Ebecryl 4883, TRPGDA, TMPTA, and N-vinylpyrrolidone) were weighted into a reactor and mixed at 50° C for 30 minutes. The reactor was cooled to room temperature (approximately 25° C.) while mixing. To the reactor contents were added the acrylated Poly-FOX prepolymer, photoinitiator, and the remaining constituents of the formulation and the system was stirred until complete mixing was achieved (approximately 30 minutes).

Coating formulations were applied to the substrates via gravure cylinder or wire wound rods at a nominal thickness of 1 to 2 mils. The coated substrates were placed on a conveyor at a speed of approximately 20 ft/min through the curing chamber. The mercury lamp emitted a 0.045 J/sq cm dose and a 0.055 W/sq cm intensity in the UVC region as measured by the EIT Powerpuck.

TABLE 1

Coating Formulation

| Component | Weight % |
| --- | --- |
| Ebecryl 4883, acrylated aliphatic urethane oligomer | 36 |
| Ebecryl 81, low viscosity amine modified acrylated polyester oligomer | 20 |
| TMPTA, trimethylolpropane triacrylate | 5 |
| TRPGDA, tripropylene glycol diacrylate | 20 |
| Irgacure 500, UV activated curative | 6.6 |
| Poly-3-Fox, polyoxetane from 3-(2,2,2-trifluoroethaoxylmethyl)-3-methyloxetane | Variable |
| NVP, N-vinylpyrrolidone | 8.4 |
| N-MEA, N-methylethylamine | 1.8 |

To the base formulation was added either Monofunctional or Di-functional Poly-3-FOX acrylate. The components of the UV curable coating were blended and mixed for 5 min. The resins were preheated below 45° C. and then applied to laminate paper.

Abrasion Resistance

The abrasion resistance of the coatings was determined using a Taber unit (Model 503) with new CS-17 wheels at a 1000 gram load, per the ASTM D 4060-95 protocol. Taber abrasion was run on 12 mil thick cured samples that were prepared by using a 20 mil bird applicator. A draw down was made on a 12" & 8" wide laminate paper made by The Leneta Company. It was cured at a rate of 30 ft/min using a 200-wt/cm lamp. The cured films were aged 24 hours before testing.

The films were cut and then remounted using a one-sided adhesive. An analytical balance was used to record sample weights. Abrasive paper was used to clean the wheels before each test (15 cycles). After the abrasion test the abraded particles were gently removed from the surface of the sample by using a soft brush. The sample was then re-weighed. The reported Taber wear number is the difference between the initial weight and the final weights in grams. The error in the wear values was +/−0.004 gr.

TABLE 2

Taber Abrasion Data

| | Monoacrylate Poly-3-FOX | | Diacrylate Poly-3-FOX | |
| --- | --- | --- | --- | --- |
| Weight % | Wear Number $10^{-3}$ | $10^{-3}$ Standard Deviation | Wear number $10^{-3}$ | $10^{-3}$ Standard Deviation |
| 0 | 59 | 7 | 59 | 7 |
| 0.5 | 38 | 0 | 24 | 4.9 |
| 1 | 27 | 3.5 | 25 | 3.2 |
| 3.1 | 27 | 4.2 | 24 | 3.2 |
| 5 | 32 | 3.8 | 26 | 0.7 |
| 20 | 23 | 1.7 | 22 | 0 |

Coefficient of Friction

The method: Modified ASTM D1894-90

(1) Mount a long strip of the sample film, in the path of the sled travel, taut across the stationery table with double-sided adhesive tapes at the two ends of the table. Either the coated or the uncoated side can be facing up, depending on whether the coefficient of friction (COF) of two coated surfaces or one coated surface is desired.

(2) Mount a piece of the sample film (2.5"×2.5") with a piece of double sided adhesive tape of any size smaller than the sled.

TABLE 3

COF of Poly-3-FOX UV Acrylate Coatings on Glass Plates (ASTM D-1894)

| | Monoacrylate Poly-3-FOX | | Diacrylate Poly-3-FOX | |
| --- | --- | --- | --- | --- |
| Weight % | COF | Standard Deviation | COF | Standard Deviation |
| 0 | 0.53 | 0.10 | 0.53 | 0.10 |
| 0.5 | 0.36 | 0.06 | 0.46 | 0.18 |
| 1 | 0.33 | 0.01 | 0.47 | 0.26 |
| 5 | 0.34 | 0.08 | 0.53 | 0.06 |
| 10 | 0.27 | 0.01 | 0.40 | 0.08 |

While in accordance with the patent statutes the best mode and preferred embodiment has been set forth, the scope of the invention is not limited thereto, but rather by the scope of the attached claims.

What is claimed is:

1. A process for forming a partially fluorinated functionalized oligomer or polymer comprising:

reacting a partially fluorinated monohydric polyoxetane containing alcohol, optionally including non-oxetane repeating units, either a) sequentially with a di or polyisocyanate forming an isocyanate terminated oligomer or polymer and then reacting said isocyanate terminated oligomer or polymer with a functionalizing compound forming a functionalized polyoxetane oligomer, or polymer or b) in a single step with an isocyanate functionalized compound and forming a functionalized polyoxetane oligomer or polymer.

2. A process according to claim 1 wherein said monohydric polyoxetane containing alcohol comprises repeating units of the formula

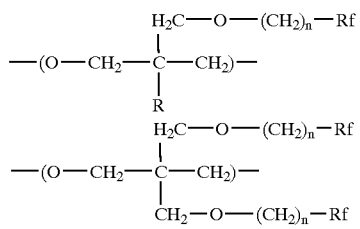

or combinations thereof, where n is the same or different and independently is an integer between 1 and 5, R is hydrogen or an alkyl of 1 to 6 carbon atoms, and each Rf is the same or different and independently on each repeat unit is a linear or branched fluorinated alkyl of 1 to 20 carbon atoms, a minimum of 75 percent of the non-carbon atoms of the alkyl being fluorine atoms and optionally the remaining non-carbon atoms being H, I, Cl, or Br; or each Rf is the same or different and independently is an oxaperfluorinated polyether having from 4 to 60 carbon atoms, and wherein said functionalized group is an acrylate, a methacrylate, an allylic, a melamine, an amine, an acetylacetate, an epoxide, a silyl, or an isocyanate, or combinations thereof.

3. A process according to claim 2, wherein said monohydric polyoxetane containing alcohol is reacted with a diisocyanate forming said isocyanate terminated polyoxetane oligomer or polymer which is then reacted with said functionalizing compound.

4. A process according to claim 1, wherein said repeat group is said

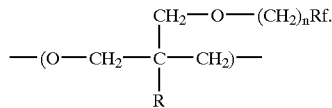

5. A process for forming a partially fluorinated functionized oligomer or polymer comprising;

reacting a partially fluorinated polyoxetane containing monohydric alcohol, optionally including non-oxetane repeating units either a) sequentially with a di or polyepoxy compound forming an epoxy terminated oligomer or polymer and then reacting that epoxy terminated oligomer or polymer with a functionalizing compound forming functionalized polyoxetane oligomer or polymer, or b) in a single step reacting said monohydric alcohol with an epoxy functionalized compound and forming an functionized polyoxetane oligomer or polymer.

6. A process according to claim 5, wherein said monohydric polyoxetane containing alcohol comprises repeating units of the formula

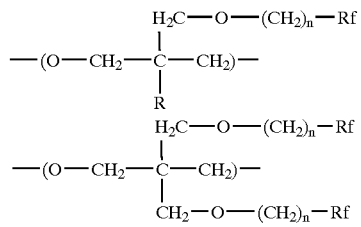

or combinations thereof, where n is the same or different and independently is an integer between 1 and 5, R is hydrogen or an alkyl of 1 to 6 carbon atoms, and each Rf is the same or different and independently on each repeat unit is a linear or branched fluorinated alkyl of 1 to 20 carbon atoms, a minimum of 75 percent of the non-carbon atoms of the alkyl being fluorine atoms and optionally the remaining non-carbon atoms being H, I, Cl, or Br; or each Rf is the same or different and independently is an oxaperfluorinated polyether having from 4 to 60 carbon atoms, and wherein said functionalized group is an acrylate, a methacrylate, an allylic, a melamine, an amine, an acetylacetate, an epoxide, a silyl, or an isocyanate, or combinations thereof.

7. A process according to claim 6, wherein said monohydric polyoxertane containing alcohol is reacted with a diepoxy forming said isocyanate terminated polyoxetane oligomer or polymer which is then reacted with said functionalizing compound.

8. A process according to claim 5, wherein said repeat unit is said

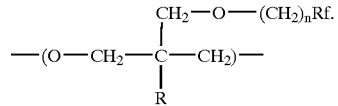

* * * * *